US009554561B2

(12) United States Patent
Axelrod et al.

(10) Patent No.: US 9,554,561 B2
(45) Date of Patent: Jan. 31, 2017

(54) LOCKING ROTATING CHEW

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 141 days.

(21) Appl. No.: 14/518,450

(22) Filed: Oct. 20, 2014

(65) Prior Publication Data

US 2016/0106068 A1    Apr. 21, 2016

(51) Int. Cl.
A01K 29/00    (2006.01)
A01K 11/00    (2006.01)

(52) U.S. Cl.
CPC .................................. A01K 15/026 (2013.01)

(58) Field of Classification Search
CPC ............................ A01K 15/025; A01K 15/026
USPC ..... 119/707, 708, 709, 710, 711, 702, 51.01
See application file for complete search history.

(56) References Cited

U.S. PATENT DOCUMENTS

| | | | |
|---|---|---|---|
| 6,155,902 A | 12/2000 | Kole, Jr. et al. | |
| 7,063,044 B2 * | 6/2006 | Handelsman | A01K 15/026 119/709 |
| 7,810,455 B2 * | 10/2010 | Axelrod | A01K 15/026 119/709 |
| 8,935,992 B2 * | 1/2015 | Axelrod | A01K 15/025 119/709 |
| 2004/0134446 A1 * | 7/2004 | Keller | A01K 15/026 119/707 |
| 2005/0166865 A1 * | 8/2005 | Handelsman | A01K 15/026 119/709 |
| 2006/0225667 A1 | 10/2006 | Handelsman et al. | |
| 2007/0022971 A1 | 2/2007 | Renforth et al. | |
| 2009/0095231 A1 * | 4/2009 | Axelrod | A01K 15/026 119/709 |
| 2009/0217885 A1 | 9/2009 | Peter et al. | |
| 2009/0255482 A1 | 10/2009 | Santarsiero | |
| 2012/0204809 A1 | 8/2012 | Axelrod et al. | |
| 2012/0318210 A1 * | 12/2012 | Anderson | A01K 15/025 119/710 |
| 2013/0055965 A1 * | 3/2013 | Valle | A01K 15/025 119/710 |

(Continued)

OTHER PUBLICATIONS

International Search Report and Written Opinion from related PCT Application No. PCT/US/5156305, dated Jan. 6, 2016.

Primary Examiner — Trinh Nguyen
(74) Attorney, Agent, or Firm — Grossman, Tucker, Perreault & Pfleger, PLLC

(57) ABSTRACT

An animal chew may include a first elongated half and a second elongated half rotatably secured to the first elongated half, wherein the first and second elongated halves are rotatable around an axis of rotation. The animal chew may also include a locking pin retained between the first elongated half and the second elongated half, wherein the locking pin slides up and down the axis of rotation into a locked position and an unlocked position. The animal chew may further include a chamber having an opening and an interior volume, wherein the chamber is formed in at least one of the first elongated half and the second elongated half. When the locking pin is in the locked position, rotation of the first elongated half relative to the second elongated half is impeded.

15 Claims, 4 Drawing Sheets

(56) References Cited

U.S. PATENT DOCUMENTS

| | | | |
|---|---|---|---|
| 2013/0104811 A1* | 5/2013 | Teconchuk | A01K 15/026 119/710 |
| 2013/0118417 A1* | 5/2013 | Teconchuk | F16B 2/20 119/710 |

* cited by examiner

LOCKING ROTATING CHEW

FIELD

The present disclosure is directed to a pet chew and, in particular, to a pet chew that includes halves rotatable relative to each other and a locking feature for stopping rotation of the halves.

BACKGROUND

Pet chews are commonly used to help satiate an animal's desire for chewing. Dogs, in particular, are driven to chew on objects for a variety of reasons. In addition to alleviating teething discomfort, dogs may chew to garner attention, alleviate boredom, redirect stress, or alleviate dietary imbalances. Chewing may also help to keep teeth clean.

A number of pet chews have been developed to receive and retain edible treats. The edible treats may retain the pet's interest in the chew, supplement the pet's diet, or may be used as a part of a reward system for the pet. The edible treats, such as biscuits or peanut butter, may be lodged within openings provided in the pet chew and may often extend out of the openings.

In one example of such a pet chew, the chew is molded as a hollow body. Treats may be inserted into the hollow cavity of the chew. The pet may try to dislodge the treats or lick the peanut butter out of the chew. In another example of such a pet chew, one or more cavities or pockets are provided in the pet chew, wherein the cavity openings are smaller in cross-section than the cavities. The treats may be lodged in or inserted through the openings.

Once the pet is finished with the edible treats or no longer has interest in the edible treats, it is often desired to remove the treats from the pet chew. It is often difficult to get any remaining bits out of the chew and clean the chew due to the very features that are used to retain the treats in the chew. Accordingly, room for improvement remains in pet chew design and, particularly, to providing a design where any remaining bits of an edible treat may be periodically cleaned out of a pet chew.

SUMMARY

An aspect of the present disclosure relates to an animal chew. The animal chew may include a first elongated half and a second elongated half rotatably secured to the first elongated half, wherein the halves are rotatable around an axis of rotation. The animal chew may also include a locking pin retained between the first elongated half and the second elongated half, wherein the locking pin slides up and down the axis of rotation into a locked position and an unlocked position. The animal chew may further include a chamber having an opening and an interior volume, wherein the chamber is formed in at least one of the first elongated half and the second elongated half. When the locking pin is in the locked position, rotation of the first elongated half relative to the second elongated half is impeded.

Another aspect of the present disclosure relates to a method of operating a pet chew. The method may include providing a pet chew including a first elongated half and a second elongated half rotatably secured to the first elongated half wherein the halves are rotatable around an axis of rotation, a locking pin retained between the first elongated half and the second elongated half, and a chamber having an opening and an interior volume, wherein the chamber is defined in at least one of the first elongated half and the second elongated half. The method may further include inserting a treat at least partially into the chamber, rotating the first elongated half relative to the second elongated half such that the interior volume of the chamber is enclosed by the first elongated half and the second elongated half except for at the opening. The locking pin may be positioned in a locked position, impeding rotation of the first elongated half relative to the second elongated half.

Yet, a further aspect of the present disclosure relates to a method of assembling an animal chew toy. The method may include providing a first elongated half and a second elongated half and positioning a locking pin in the first elongated half and in the second elongated half. The method may further include inserting a flange extending from the first elongated half into a channel defined in the second elongated half and engaging the flange in the channel so as to secure the first elongated half relative to the second elongated half.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure relates to a pet chew and, in particular to a pet chew that includes two halves, rotatable relative to each other, and a locking feature to impede rotation. The chew also includes a chamber have an interior volume for securing a treat, at least partially within. The treat may be an edible treat such as a biscuit, peanut butter, or another pet chew exhibiting different characteristics. The interior volume may be exposed upon rotating the two halves, allowing the interior volume to be cleaned out and new treat to be inserted into the interior volume.

Figure 1:
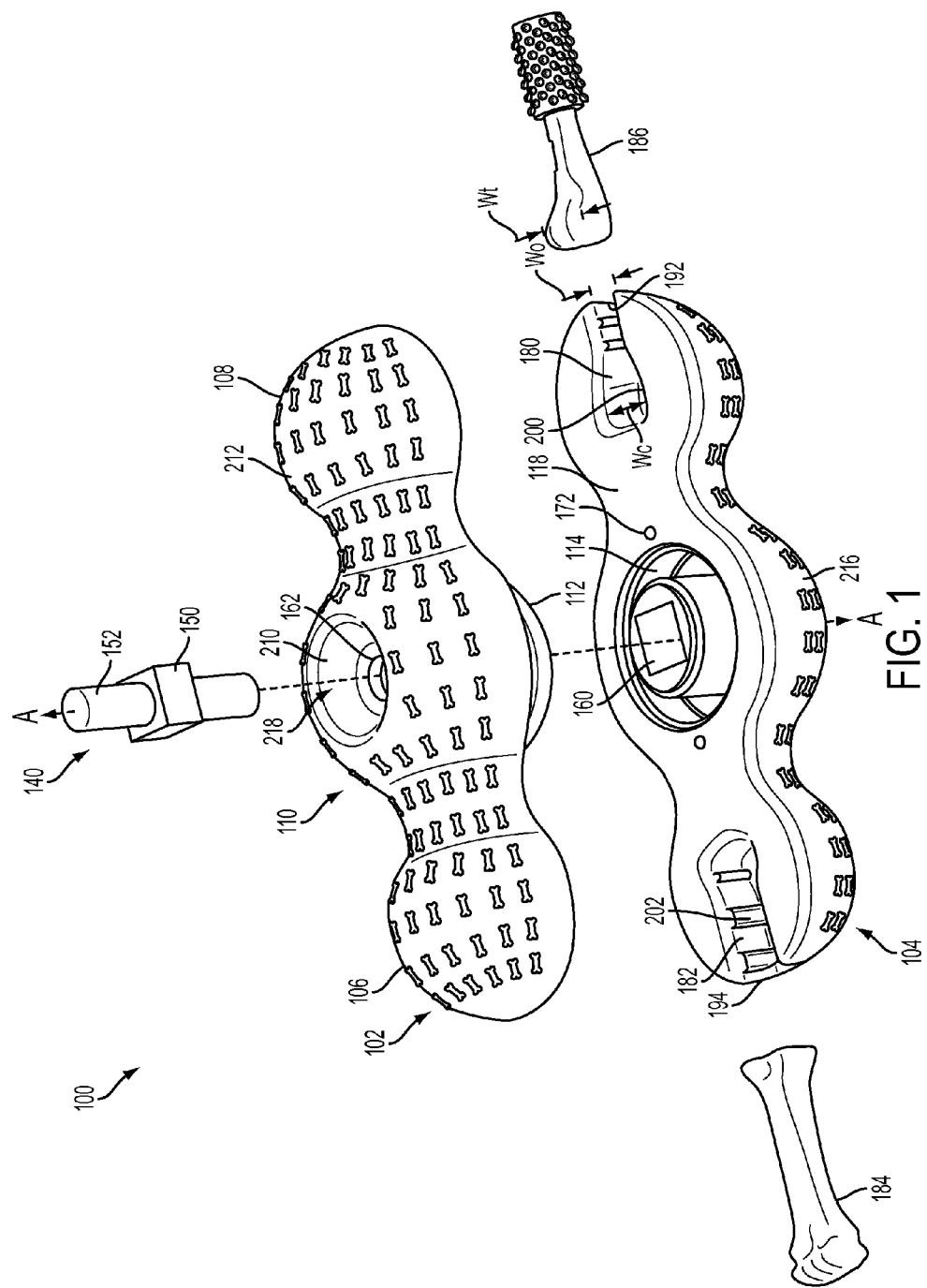
FIG. 1 illustrates a perspective exploded view of an embodiment of a pet chew disclosed herein.
Figure 2:
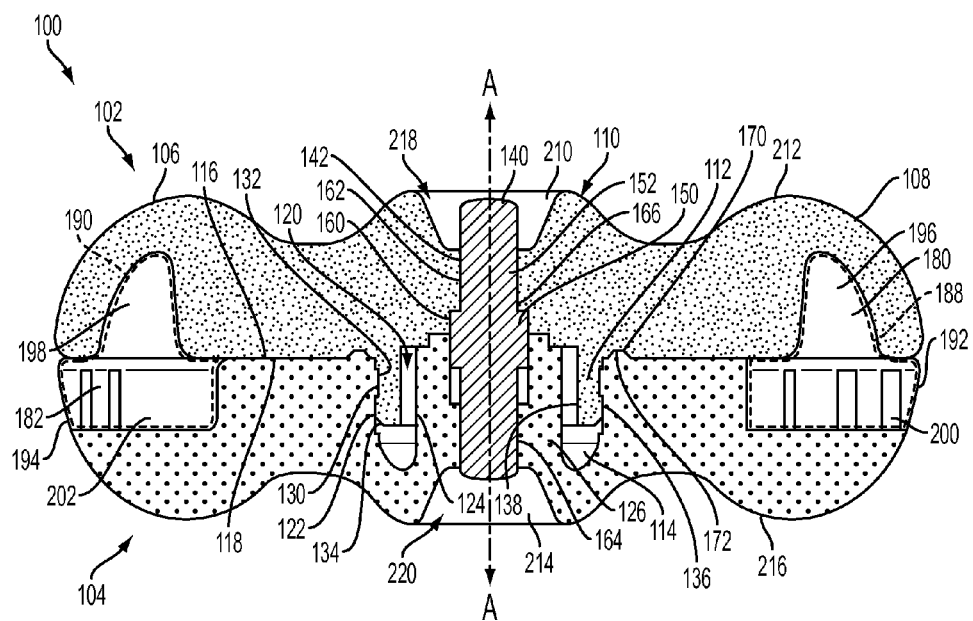
FIG. 2 illustrates a cross-sectional view of the pet chew of FIG. 1 illustrating the locking pin in a locked position.
Figure 3:
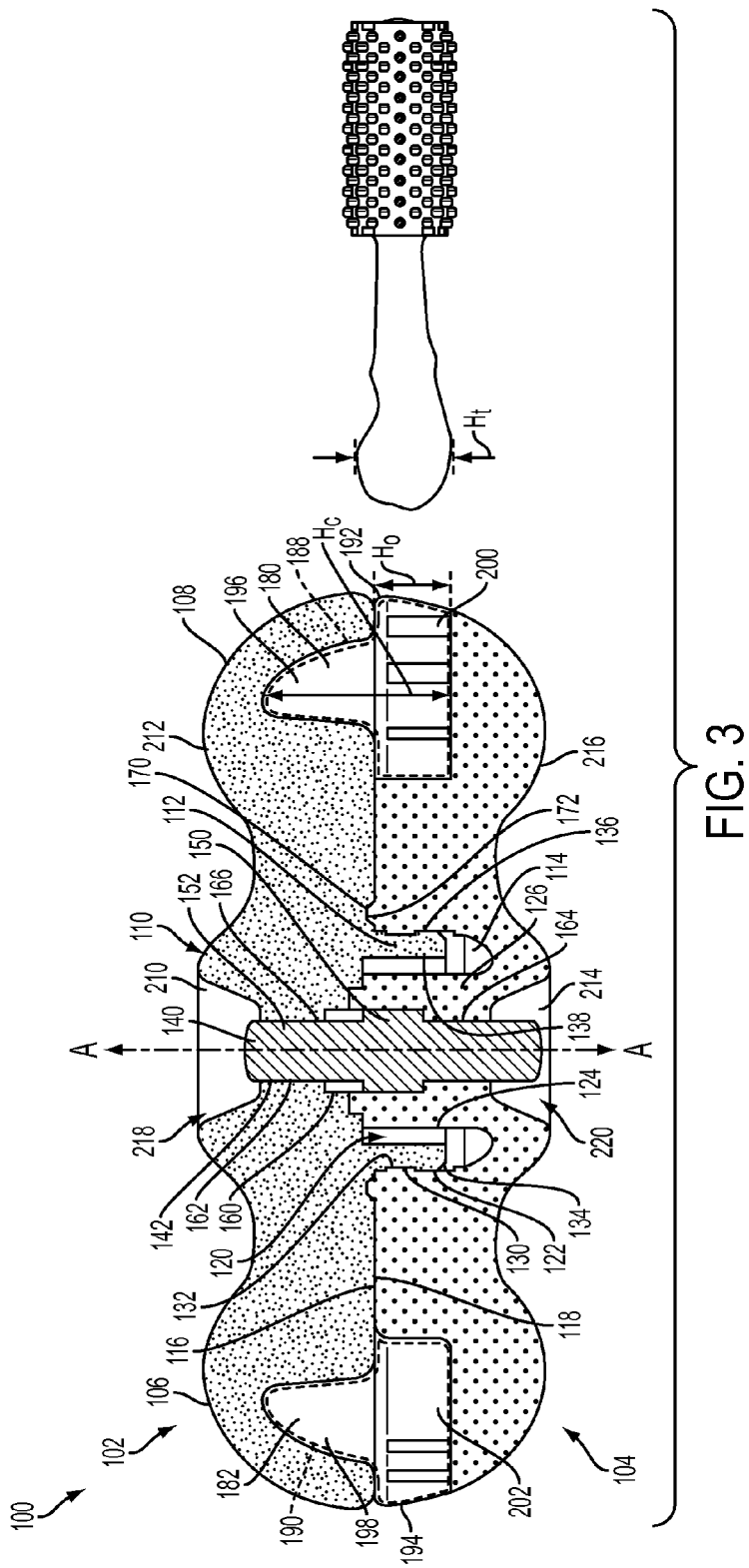
FIG. 3 illustrates a cross-sectional view of the pet chew of FIG. 1 illustrating the locking pin in an unlocked position.

FIGS. 1, 2 and 3 illustrate an exemplary embodiment of a pet chew herein. The pet chew 100 may include two elongated halves, a first elongated half 102 and a second elongate half 104. As illustrated, when aligned, the two elongated halves may assume the general shape of a dog bone having two arms 106, 108 each including a bulbous end. The arms extend from a center hub 110. Other alternative geometries may be assumed as well. For example, three, four, five, or six arms may be present extending from a center hub. In another example, a single or multiple arms arm joining at an end may be present extending from a hub positioned at the end of the arms.

The two elongated halves may be formed of a polymer material, such as, acrylonitrile butadiene styrene (ABS), high impact polystyrene (HIPS), polypropylene (PP), high density polyethylene (HDPE), nylon or polyurethane. The polymer material may be a thermoplastic or a thermoset material. Further, additives, such as colorants, flavorants, or attractants may be incorporated into the polymer material used to make the mold halves. Each elongated half may be formed from the same of different polymer materials. In addition, regardless of whether the polymer material selected is the same or different, the elongated halves may be formed with different colorants, flavorants or attractants. In embodiments, the halves may be formed by a molding process, such as injection molding or compression molding, wherein the polymer material is caused to flow and fill a cavity to shape the elongated half.

The two elongated halves 102, 104 may be secured together in a rotatable manner. As illustrated, the two elongated halves are secured together in the center of the elongated halves, at the hub 110. As alluded to above, in other embodiments, the elongated halves may be secured together at a hub located at either end of the elongated halves or between the center and either end of the elongated halves. To secure the halves together, a flange 112 extending from one elongated half may be received in a channel 114 formed in the other elongated half, which prevents the two halves 102, 104 from being separated but allows the two halves to rotate relative to each other around an axis of rotation A-A.

For example, the flange 112 may extend from a surface 116 of the first elongated half 102. In embodiments, the flange 112 may be arcuate. And, in particular embodiments, such as in the illustrated embodiment, the flange 112 may be circular, wherein the circle formed by the flange is concentric with the axis of rotation A-A. The circular flange 112 may define a hollow cylindrical opening 120 therein.

The flange 112 may be received within the channel 114 defined in a surface 118 of the second elongated half 104. Like the flange 112, the channel 114 may be arcuate. And, in particular embodiments, such as in the illustrated embodiment, the channel 114 may be circular and concentric with the axis of rotation A-A. The channel 114 may include an outer wall 122 and an inner wall 124, wherein the inner wall forms a cylindrical body 126. The cylindrical body 126 may be at least partially received in the hollow cylindrical opening 120 of the flange 112 when the two elongated halves are joined and secured together.

The flange 112 and the channel 114 may each include a retention feature, which when engaged, secures the flange 112 within the channel 114. For example, the outer wall 122 of the channel 114 may include a tongue 130 and the flange 112 may include a groove 132 that receives the tongue 130 therein. The tongue 130 may extend around the surface of the outer wall 124 and the groove 132 may extend around the entire periphery of the flange 112. This arrangement may prevent the elongated halves 102, 104 from being moved apart along the length of the axis A-A, but allows for rotation of the two halves relative to each other around the axis A-A.

While the retention features are illustrated as being on the outer wall 122 of the channel 114 and the outer wall 136 of the flange 112, the retention features may alternatively be formed on the inner wall 124 of the channel 114 and the inner wall 138 of the flange 112. In addition, the tongue 130 may be positioned on the flange and the groove may be positioned in the channel wall in alternative embodiments. Further, the channel 114 may be wider than the width of the flange 112. This may provide room for the flange 112 to deflect when being inserted into the channel 114 and over the tongue 130. To assist in assembly, the end of the flange 112 may include a chamfer 134 on the surface that the groove is located. The chamfer may provide a "lead in" so as to prevent the flange 112 from getting stuck or hung up on the tongue 130.

Rotation of the two halves relative to each other may be impeded by a locking device. The locking device prevents the elongated halves from rotating while a pet is chewing on the chew. The locking device may include a locking pin 140 positioned within a locking hole 142 and oriented along the axis of rotation A-A. The hole 142 is formed through the first and second elongated halves 102, 104. The hole 142 may include a locking cavity that is created upon assembly of the two halves. In addition the hole 142 may include bores extending from the locking cavity to the exterior surfaces of the chew.

Figure 4:
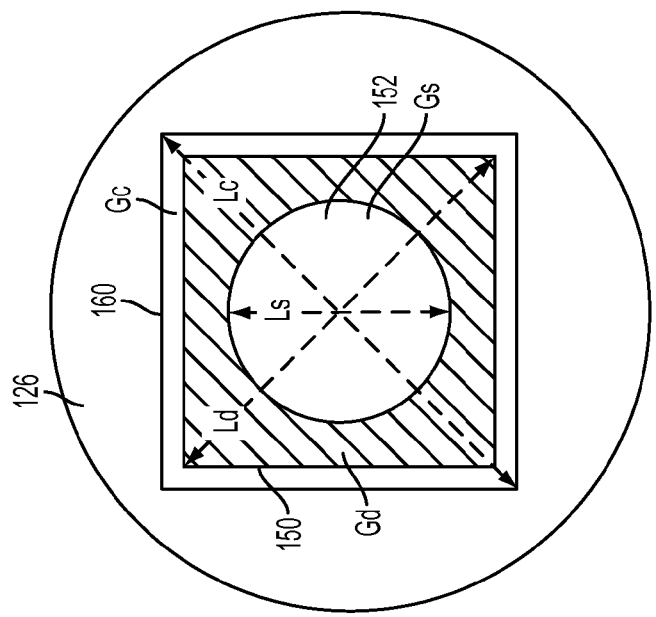
FIG. 4 illustrates a top down view of the second elongated half of the pet chew of FIG. 1 illustrating the cross-sectional geometry of the detent of the locking pin.

The locking pin 140 may include a detent 150. As illustrated, the detent 150 may be positioned near the center of the locking pin shank 152. However, other arrangements may be presented where the detent 150 may be positioned off center on the pin 140. The detent 150 may exhibit a first cross-sectional geometry $G_d$ as illustrated in FIG. 4. The cross-sectional geometry $G_d$ of the detent 150 may exhibit a largest linear dimension that is greater than the largest linear dimension exhibited by the cross-sectional geometry $G_s$ of locking pin shank 152.

The cross-sectional geometry $G_d$ of the detent 150 may also exhibit at least one angular portion having an angle of less than 180 degrees, and preferably, less than 90 degrees. In embodiments, the cross-sectional geometry is polygonal. As illustrated, the cross-sectional geometry assumes the shape of a square. Alternatively, the cross-sectional geometry may assume the shape of a half-circle, rectangle, triangle, pentagon, hexagon, heptagon, octagon, or star. In further alternative embodiments, the cross-sectional geometry may be elliptical or tear dropped shaped. The locking pin shank 152 extending from either side of the detent 150 may assume any geometry, such as circular, elliptical, square, etc.

Figure 5:
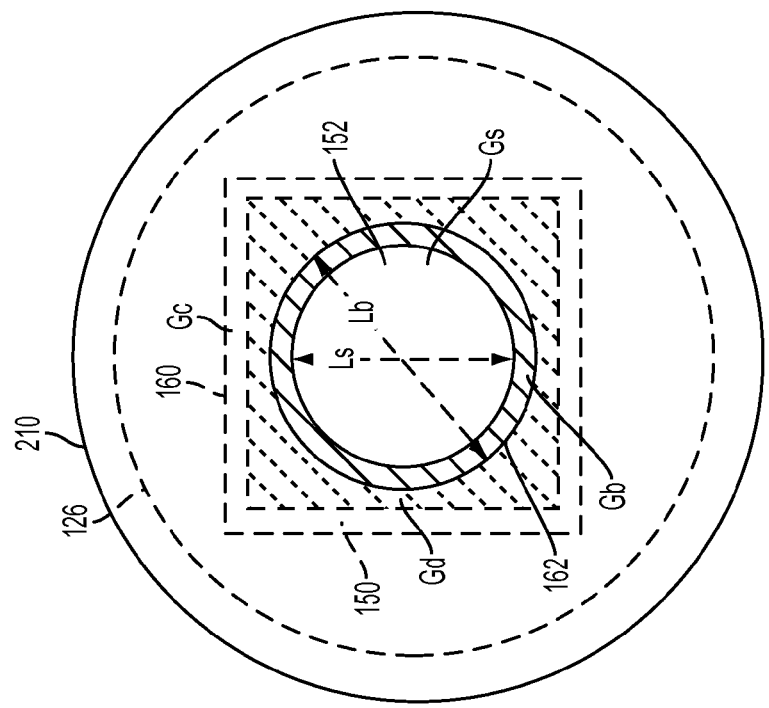
FIG. 5 illustrates a top down view of the first elongated half of the pet chew of FIG. 1 illustrating the cross-sectional geometry of the locking hole bore relative to the cross-sectional geometry of the locking pin shank.

The locking hole 142, in which the locking pin 140 is positioned, may include a locking cavity 160. The locking cavity 160 accommodates the detent 150 and, as seen in FIG. 5, the locking cavity 160 exhibits a larger cross-sectional geometry $G_c$ than the cross-sectional geometry $G_t$ of the bores 162, 164 extending from either side of the locking cavity 160. The transition between the locking cavity 160 and the bores 162, 164 forms shoulders 166 (see FIGS. 2 & 3), which form stops and retain the detent 150 within the locking cavity 160. At least one surface of the locking cavity 160 interferes with the detent 150 to prevent rotation of the detent 150. In the illustrated embodiments, the locking cavity 160 may exhibit the same or a similar cross-sectional geometry $G_c$ (within 5% of the dimensions) as the cross-sectional geometry $G_d$ of the detent 150, see FIG. 4. The locking cavity 160 is formed in both the first elongated half 102 and the second elongated half 104, so that the detent 150 of the locking pin may be positioned in either of the elongated halves, one of the elongated halves, or in both elongated halves.

When the locking pin 140 is in the locked position, the detent 150 is positioned in a location in the locking cavity 160 where the detent 150 is positioned in both the first elongated half 102 and the second elongated half 104, as seen in FIG. 2. In such a manner, the detent 150 impedes the ability of the first elongated half 102 to rotate relative to the second elongated half 104. FIG. 3 illustrates that when the locking pin 140 is in the unlocked position, the detent 150 is located only within one of the two elongated halves. As illustrated, the detent is located only in the second elongated half 104. Alternatively, the detent may be positioned in only the first elongated half 102 and the first bore 162. Positioning the detent in the second elongated half 104 allows the first elongated half 102 to rotate relative to the second elongated half. Given that the detent 150 of the locking pin 140 may be retained in the second elongated half 104 when in the unlocked position, the second elongated half 104 may not rotate relative to the locking pin 140.

The longest linear dimension $L_s$ of the cross-sectional geometry $G_s$ of the locking pin shank 152 may be smaller than the longest linear dimension $L_d$ of the cross-sectional geometry $G_d$ of the detent 150, see FIG. 4. In addition, the longest linear dimension $L_s$ of the cross-sectional geometry $G_s$ of the locking pin shank may be smaller than the smallest linear dimension $L_b$ of the cross-sectional geometry $G_b$ of the bore 162 as illustrated in FIG. 5. This allows the shank to rotate in the bores 162, 164, particularly when the locking pin is in the unlocked position and the first elongated half 102 may rotate around the locking pin 140.

Further, depending on the geometry of the detent 150 and the locking cavity 160, the first elongated half 102 and the second elongated half 104 of the chew toy 100 may be locked in a variety of positions around the axis or rotation A-A. In cases where the detent 150 assumes the cross-sectional geometry of a square and the locking cavity 160 also assume the cross-sectional geometry of a square, the first elongated half 102 may be locked in four different positions relative to the second elongated half 104. In two of the locking positions, which are 180 degrees from each other around the axis of rotation A-A, the first elongated half 102 may overly the second elongated half 104 such that they are substantially co-extensive or parallel with each other. In two other locking positions, which are also 180 degrees from each other around the axis of rotation A-A, the first elongate half 102 may overly the second elongated half 104 such that the halves are perpendicular to each other. It may be appreciated that the number of locking positions may be determined by the number of sides or elongated portions present. For example, if three sides are present, where the detent and locking cavity are in the shape of a triangle, the elongated halves may have three locking positions. Where the detent and locking cavity are in the shape of a pentagon, the elongated halves may have five locking positions. If the detent and locking cavity are in the shape of an ellipse, the elongated halves may have two locking positions, etc.

A track 170 and guide 172 may be provided on the adjoining surfaces 116, 118 of the first elongated half 102 and the second elongated half 104. As illustrated, the track 170 is formed in the surface 116 of the first elongated half 102 and the guide 172 extends from a surface 118 of the second elongated half 104 and is received in the track 170. Alternatively, the track may be formed in the surface of the second elongated half and the guide may extend from the surface of the first elongated half. The track may be circular in shape and concentric to the axis of rotation A-A. The guide may also be circular in shape and concentric to the axis of rotation A-A. However, as illustrated in FIG. 1, the guides 172 may also be formed of one or more projections that assume the shape of a hemisphere that extend from the surface opposing the track and are received in the track. The track and guide may assist in maintaining alignment between the two elongated halves as the halves rotate relative to each other. Further, when the track and guide are circular, the track and guide may act as a seal preventing residue from treats held by the chew 100 from passing into the hub area 110 and fouling the rotational movement of the elongated halves 102, 104 relative to each other.

The chew 100 may also include one or more chambers 180, 182 for retaining treats 184, 186. The treats 184, 186 may be, at least partially, inserted into the opening and may extend from the opening. The treats 184, 186 may be edible treats, including biscuits, smaller chews, or pastes such as peanut butter or dental paste. Smaller chews may include those made from rawhide, vegetable flours, vegetable starches, vegetable proteins, grain flours, grain starches, or grain proteins. As illustrated, the chambers 180, 182 are formed in the first and second elongated half 104 of the chew 100. Each chamber 180, 182 include an interior volume 188, 190 and an opening 192, 194, which provides communication between the interior volume 188, 190 and the exterior of the chew 100 when the halves of the chew are aligned. Thus, the interior volume is enclosed by the first and second elongated halves except for at the opening 192, 194. When the halves of the chew 100 are offset, such as when they are perpendicular to each other, the interior volume 188, 190 of the chambers are exposed. This makes it easier to clean the chambers of the chew and remove any residual particles or pastes that may have been deposited by treats 184, 186 inserted into the chambers 180, 182.

As illustrated, the upper portion of the chambers 196, 198 in the first elongated half 102 may not only provide space for the insertion of a treat but may also reduce the wall thickness of the first elongated half 102. This may reduce cooling time and stresses after molding the elongated half 102 out of a polymer material. The lower portion of the chambers 200, 202 may similarly reduce cooling time and stresses after molding the second elongated half 104 out a polymer material. Further, the lower portion of the chambers 200, 202 may exhibit a similar geometry as a treat 184, 186 that is to be inserted into the chamber. In further embodiments, the upper portion of the chambers 196, 198 may also or alternatively exhibit a similar geometry as the treat to be inserted into the chamber 180, 182. In embodiments, such as the illustrated embodiment, the treat is positioned in only one of the two portions 200, 202 of the chamber. Further, as illustrated, the treat is located only in the lower half of the chamber 200, 202 defined in the second elongated half 104. However, in alternative embodiments, the treats 184, 186 may be located in only the upper portions 196, 198 of the chamber defined in the first elongated half 102.

In particular embodiments, such as that illustrated, at least one cross-sectional dimension of the opening may be smaller than the corresponding cross-sectional dimension of the chamber. For example, the height of the opening $H_o$ may be smaller than the height of the chamber $H_c$. Or, the width of the opening $W_o$ may be smaller than the width of the chamber $W_c$. In embodiments, both the height of the opening may be smaller than the height of the chamber and the width of the opening may be smaller than the width of the chamber.

Similarly, the portion of the treat 184, 186 that is inserted into the interior volume of a chamber 180, 182 may exhibit a height $H_t$, width $W_t$, or both height and width that is larger than the height, width or both height $H_o$ of the opening and width $W_o$ of the opening. This arrangement, where the width or height of the portion of the treat inserted into the interior volume of the chamber is larger than the height or width of the opening may assist in retaining the treat within the interior volume of the chamber 180, 182, at least until the pet has worn the surfaces of the treat away.

In embodiments, a treat inserted into either of the chambers 180, 182 may exhibit a different set of mechanical properties than the chew 100. Mechanical properties may include Young's modulus, tensile strength, hardness, wear resistance, and flexural modulus. At least one of the properties may differ to create a different set of mechanical properties. In embodiments, the hardness of the treat retained in the chew may be in the range of 70 to 90 Shore A and the chew 100 may exhibit a hardness in the range of 10 to 89 Shore D, including all values and ranges therein. In other embodiments the treat retained in the chew may exhibit a ultimate tensile strength of less than 10,000 psi and the chew 100 may exhibit an ultimate tensile strength of 10,000 psi or greater.

In addition, a first recess 210 may be provided in the external surface 212 of the first elongated half 102 and a second recess 214 may be provided in the external surface 216 of the second elongated half 104. The recesses 210, 212 may be concentric with the axis of rotation A-A. The bores 162, 164 may open into the bottom of the recesses 210, 214 providing communication from the locking cavity to the recesses 210, 214. The shank 152 of the locking pin 140 may extend through the bores 162, 164 into the recesses 210, 214. This allows access to the locking pin 140 so that a force can be applied to the locking pin 140 to move the locking pin 140 up and down the axis of rotation A-A into a locked and unlocked position. It also partially shields the locking pin 140 from being adjusted by a pet. For example, when a force is applied to the external surfaces 212, 216, the recesses 210, 214 may prevent the force from being applied to the locking pin shank 152, particularly if the force is applied by an object that is larger than the opening 218, 220 of the recesses at the external surfaces 212, 216 of the chew 100.

Accordingly, the present disclosure also relates to a method of operating a pet chew and feeding a pet treats with the pet chew. The method may include inserting a treat at least partially in one of the chambers and rotating the elongated halves relative to each other such that the interior volume of the chamber is enclosed by the elongated halves, although the opening may be left exposed. The method may further include positioning the locking pin in a locked position, impeding the rotation of the two elongated halves relative to each other. Prior to inserting the treat into the chew, one may need to position the locking pin in the unlocked position and rotating the first half relative to the second half to expose the interior volume of the chamber in which the treat will be positioned. Further, one may need to clean the interior volume of the chamber out, which may be performed when the interior volume of the chamber is exposed.

Furthermore, the present disclosure relates to assembling the pet chew together. As alluded to above, the two elongated halves 102, 104 may be formed by a variety of forming processes such as milling a piece of solid stock or molding the chew by a melt processing method. The locking pin may be inserted into the hole formed in of the first and second elongated halves. Then the flange of one half may be inserted into the channel formed in the other half. The retention features provided on both halves may interlock and cause the first and second half to be secured so they cannot be separated. However, the elongated halves may rotate relative to each other.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. An animal chew, comprising:
   a first elongated half and a second elongated half, wherein:
   the first elongated half comprises an opening and a flange, the flange extending from a surface of the first elongated half and around the opening;
   the second elongated half comprises a channel and a locking cavity comprising a planar surface, the channel extending around the locking cavity; and
   the flange is received in the channel such that the first elongated half and second elongated half are rotatably secured to one another, with an axis of rotation extending along and within said opening and said locking cavity;
   the animal chew further comprises:
   a locking pin oriented retained between said first elongated half and said second elongated half, wherein said locking pin comprises a planar surface and slides up and down said axis of rotation into a locked position and an unlocked position; and
   a chamber having an opening and an interior volume, wherein said chamber is formed in at least one of said first elongated half and said second elongated half;
   wherein:
   when said locking pin is in said unlocked position, the first elongated half and second elongated half are rotatable about said axis of rotation; and
   when said locking pin is in said locked position rotation of said first elongated half relative to said second elongated half is impeded by an abutment of the planar surface of the locking pin with the planar surface of the locking cavity.

2. The animal chew of claim 1, further comprising retention features to secure said flange in said channel.

3. The animal chew of claim 2, wherein said retention features include a tongue extending from said channel and a groove in said flange, wherein said tongue is received in said groove.

4. The animal chew of claim 1, further comprising a track formed in said first elongated half and a guide extending from said second elongated half, wherein said guide is received in said track.

5. The animal chew of claim 1, wherein said first elongated half and said second elongated half define a hub and at least two arms extending from said hub, wherein said hub is concentric with said axis of rotation.

6. The animal chew of claim 5, wherein at least one of said chambers is included in each of said arms.

7. The animal chew of claim 1, further comprising a treat at least partially inserted into said interior volume of said chamber.

8. The animal chew of claim 7, wherein said treat extends through said opening.

9. The animal chew of claim 7, wherein said treat is edible.

10. The animal chew of claim 1, wherein said locking pin includes a detent exhibiting a cross-sectional geometry, the detent further comprising said planar surface of said locking pin.

11. The animal chew of claim 10, wherein said locking cavity has a geometry corresponding to the cross sectional geometry of said detent.

12. The animal chew of claim 11, wherein said opening in said first elongated half comprises a second locking cavity, the second locking cavity that is substantially aligned with the lcoking cavity of the second elongated half.

13. The animal chew of claim 10, wherein said cross-sectional geometry is polygonal.

14. The animal chew of claim 13, wherein said cross-sectional geometry is square.

15. The animal chew of claim 1, wherein said locking pin is non-rotatable relative to either said first elongated half or said second elongated half when in said unlocked position.

* * * * *